(12) United States Patent
Kuban

(10) Patent No.: US 7,991,351 B2
(45) Date of Patent: Aug. 2, 2011

(54) EXTENSION OF WIRED CONTROLLER AREA NETWORKS TO WIRELESS PERSONAL AREA NETWORKS

(76) Inventor: Paul A. Kuban, Mount Vernon, IN (US)

( * ) Notice: Subject to any disclaimer, the term of this patent is extended or adjusted under 35 U.S.C. 154(b) by 752 days.

(21) Appl. No.: 12/036,484

(22) Filed: Feb. 25, 2008

(65) Prior Publication Data

US 2008/0274689 A1 Nov. 6, 2008

Related U.S. Application Data

(60) Provisional application No. 60/892,094, filed on Feb. 28, 2007.

(51) Int. Cl.
*H04Q 7/20* (2006.01)
(52) U.S. Cl. ............ 455/7; 455/461; 455/462; 455/465; 455/403; 455/422.1; 370/351; 370/401
(58) Field of Classification Search .............. 455/7, 461, 455/462, 465, 445, 403, 422.1, 426.1, 426.2, 455/456.1–457, 550.1, 414.1–414.4; 370/351, 370/401
See application file for complete search history.

(56) References Cited

U.S. PATENT DOCUMENTS

| | | | | |
|---|---|---|---|---|
| 5,526,401 A | * | 6/1996 | Roach et al. | 455/426.1 |
| 5,845,202 A | * | 12/1998 | Davis | 455/412.2 |
| 2002/0080774 A1 | * | 6/2002 | Griffith et al. | 370/352 |

OTHER PUBLICATIONS

"CAN Specification Version 2.0", Robert Bosch GmBH, 1991.
Kongezos, V. K. and C. R. Allen, "Wireless Communication Between A.G.V.s (Autonomous Guided Vehicle) and the industrial network C.A.N. (Controller Area Network)", in Proceedings of the 2002 IEEE International Conference on Robotics and Automation, vol. 1 ed, Washington, DC, USA: IEEE, 2002, pp. 434-437.
Guerrero, C., G. Rodriguez-Navas, and J. Proenza, "Design and Implementation of a Redundancy Manager for Triple Redundant CAN Controllers", in IECON—2002, 28$^{th}$ Annual Conference of the IEEE Industrial Electronics Society (Cat. No. 02CH37363), vol. 3 ed, Sevilla, Spain: IEEE, 2002, pp. 2294-2299.
Byres, E. J., "Designing Secure Networks for Process Control", IEEE Industry Applications Magazine, vol. 6, No. 5, Sep. 2000, pp. 33-39.
"IEEE 802 Part 15.4: Wireless Medium Access Control (MAC) and Physical Layer (PHY) Specifications for Low-Rate Wireless Personal Area Networks (LR-WPANs)", IEEE, 2003.
Huang, H. W., "MC68HC12 An Introduction: Software and Hardware Interfacing", Thompson-Delmar Learning, 2003, pp. 506-557.
Farsi, M. and K. Ratcliff, "CANopen: The Open Communications Solution", in ISIE '97, Proceedings of the IEEE International Symposium on Industrial Electronics, vol. 1 ed, Guimaraes, Portugal: IEEE, 1997, pp. 112-116.
Farsi, M., K. Ratcliff, and M. Barbosa, "An overview of controller area network", Computing & Control Engineering Journal, vol. 10, No. 3, Jun. 1999, pp. 113-120.

(Continued)

*Primary Examiner* — Keith T Ferguson
(74) *Attorney, Agent, or Firm* — Barnes & Thornburg LLP

(57) ABSTRACT

An architecture to extend a wired controller area network (CAN) to the wireless domain of a low rate wireless personal area network (PAN) network is described herein. Such architecture provides a low cost, low power, efficient, and secure wireless network interface compatible with many existing SCADA infrastructure networks, in addition to countless other installations incorporating a CAN backbone. An architectural model for such an extension module includes additions to the CAN protocol stack. New protocols for the tunneling of messages and for enhancing reliability are also described.

18 Claims, 9 Drawing Sheets

OTHER PUBLICATIONS

Brooks, M. J., "Controller Area Network for Monitor and Control in ALMA", Proceedings of the SPIE— The International Society for Optical Engineering, vol. 4009, 2000, pp. 288-297.

Castro, M., R. Sebastian, F. Yeves, J. Peire, J. Urrutia, and J. Quesada, "Well-Known Serial Buses for Distributed Control of Backup Power Plants. RS-485 versus Controller Area Network (CAN) Solutions", In IECON Proceedings (Industrial Electronics Conference), 3 ed, Sevilla, Spain: Institute of Electrical and Electronics Engineers Computer Society, 2002, pp. 2381-2386.

Furmanski, P. and Z. Stolarski, "Controller Area Network Implementation in Microwave Systems", in 14th International Conference on Microwaves, Radar and Wireless Communications, MIKON—2002. Conference Proceedings, vol. 3 ed, Gdansk, Poland; Telecommun. Res. Inst., 2002, pp. 869-873.

Moraes, F., A. Amory, N. Calazans, E. Bezerra, and J. Petrini, "Using the CAN Protocol and Reconfigurable Computing Technology for Web-Based Smart House Automation", in Symposium on Integrated Circuits and Systems Design, Pirenopolis, Brazil: IEEE Comput. Soc, 2001, pp. 38-43.

Roengruen, P., T. Suesut, V. Tipsuwanporn, V. Kongratana, and S. Kulphanich, "Design of PLC Networks Using Remote I/O Module Based on Controller Area Network", in Canadian Conference on Electrical and Computer Engineering 2001. Conference Proceedings, vol. 2 ed, Toronto, Ont., Canada: IEEE, 2001, pp. 1023-1027.

Wargui, M. and A. Rachid, "Application of Controller Area Network to Mobile Robots", in Proceedings of the Mediterranean Electrotechnical Conference—MELECON, 1 ed, Bari, Italy: IEEE, Piscataway, NJ, USA, 1996, pp. 205-207.

Livani, M. Ali, and J. Kaiser, "Evaluation of a Hybrid Real-Time Bus Scheduling Mechanism for CAN", in Parallel and Distributed Processing, 11th IPPS/SPDP'99 Workshops Held in Conjunction with the 13th International Parallel Processing Symposium and 10th Symposium on Parallel and Distributed Processing Proceedings. San Juan, Puerto Rico: Springer-Verlag. 1999 pp. 425-429.

Dobrin, R. and G. Fohler, "Implementing Off-Line Message Scheduling on Controller Area Network (CAN)", in ETFA 2001, 8th International Conference on Emerging Technologies and Factory Automation Proceedings (Cat. No. 01TH8597), vol. 1 ed, Antibes-Juan les Pins, France: IEEE, 2001, pp. 241-245.

Ekiz, H., A. Kutlu, M. D. Baba, and E. T. Powner, "Performance Analysis of a CAN/CAN Bridge", in International Conference on Network Protocols, Columbus, OH, USA: IEEE, Los Alamitos, CA, USA, 1996, pp. 181-188.

Ekiz, H., A. Kutlu, and E. T. Powner, "Design and Implementation of a CAN/CAN Bridge", in Proceedings, Second International Symposium on Parallel Architectures, Algorithms, and Networks, Beijing, China: IEEE Comput. Soc. Press, 1996, pp. 507-513.

Lian, F. L., J. R. Moyne, and D. M. Tilbury, "Performance Evaluation of Control Networks: Ethernet, ControlNet, and DeviceNet", IEEE Control Systems Magazine, vol. 21, No. 1, Feb. 2001, pp. 66-83.

Jeon, M. J., D. W. Kim, H. S. Kim, Y. J. Cho, B. H. Lee, "An Analysis of Network-Based Control System Using CAN (Controller Area Network) Protocol", in Proceedings 2001, IEEE International Conference on Robotics and Automation, vol. 4 ed, Seoul, South Korea, IEEE, 2001, pp. 3577-3581.

Navet, N., Y. Q. Song, and F. Simonot, "Worst-Case Deadline Failure Probability in Real-Time Applications Distributed Over Controller Area Network", Journal of Systems Architecture, vol. 46, No. 7, Apr. 2000, pp. 607-617.

Nolte, T., H. Hansson, and C. Norstrom, "Probabilistic Worst-Case Response-Time Analysis for the Controller Area Network", in Proceedings of the 9th IEEE Real-Time and Embedded Technology and Applications Symposium, Toronto, Ont., Canada, IEEE Comput. Soc., 2003, pp. 200-207.

Punnekkat, S., H. Hansson, and C. Norstrom, "Response Time Analysis Under Errors for CAN", in Proceedings Sixth IEEE Real-Time Technology and Applications Symposium, RTAS 2000, Washington, DC, USA: IEEE Comput. Soc., 2000, pp. 258-265.

Almeida, L., P. Pedreiras, and J. A. G. Fonseca, "The FTT-CAN Protocol: Why and How", IEEE Transactions on Industrial Electronics, vol. 49, No. 6, Dec. 2002, pp. 1189-1201.

Cena, G. and A. Valenzano, "An Improved CAN Fieldbus for Industrial Applications", IEEE Transactions on Industrial Electronics, vol. 44, No. 4, 1997, pp. 553-564.

Cena, G. and A. Valenzano, "FastCAN: a High-Performance Enhanced CAN-like Network", IEEE Transactions on Industrial Electronics, vol. 47, No. 4, Aug. 2000, pp. 951-963.

Pinho, L. M. and F. Vasques, "Improved Fault Tolerant Broadcasts in CAN", in IEEE Symposium on Emerging Technologies and Factory Automation, ETFA, 1 ed, Antibes-Juan les Pins: Institute of Electrical and Electronics Engineers Inc., 2001, pp. 305-313.

Misbahuddin, S. and N. Al-Holou, "Efficient Data Communication Techniques for Controller Area Network (CAN) Protocol", in Book of Abstracts, ACS/IEEE, International Conference on Computer Systems and Applications, Tunis, Tunisia: IEEE, 2003, p. 22.

Abramson, N., "Multiple Access in Wireless Digital Networks", Proceedings of the IEEE, vol. 82, No. 9, 1994 pp. 1360-1370.

Buchholz, D., P. Odlyzko, M. Taylor, and R. White, "Wireless in-Building Network Architecture and Protocols", IEEE Network Magazine, vol. 5, No. 6, 1991, pp. 31-38.

Gummalla, A. C. V., and J. O. Limb, "An Access Protocol for a Wireless Home Network", in WCNC, 1999, IEEE Wireless Communications and Networking Conference, vol. 3 ed, New Orleans, LA, USA: IEEE, 1999, pp. 1392-1396.

Jones, C. E., K. M. Sivalingam, P. Agrawal, and J. C. Chen, "A Survey of Energy Efficient Network Protocols for Wireless Networks", Wireless Networks, vol. 7, No. 4, 2001, pp. 343-358.

Kuban, P. A., R. K. Ragade, "The CAN Microcluster: Parallel Processing Over the Controller Area Network", ACM Journal on Educational Resources in Computing (JERIC), vol. 5, No. 1, 2005.

Callaway, E., P. Gorday, L. Hester, J. A. Gutierrez, M. Naeve, B. Heile, and V. Bahl, "Home Networking with IEEE 802.15.4: A Developing Standard for Low-Rate Wireless Personal Area Networks", IEEE Communications Magazine, vol. 40, No. 8, 2002, pp. 70-77.

Callaway Jr., E.H., "Wireless Sensor Networks—Architectures and Protocols", Boca Raton, FL: CRC Press LLC, 2004, pp. 1-17.

Lu, G., B. Krishnamachari, and C. S. Raghavendra, "Performance Evaluation of the IEEE 802.15.4 MAC for Low-Rate Low-Power Wireless Networks", in Conference Proceedings of the 2004 IEEE International Performance, Computing, and Communications Conference (IEEE Cat. No.04CH37549), Phoenix, AZ, USA: IEEE, 2004, pp. 701-706.

Howitt, I. and J. A. Gutierrez, "IEEE 802.15.4 Low Rate—Wireless Personal Area Network Coexistence Issues", in WCNC 2003, 2003 IEEE Wireless Communications and Networking Conference Record (Cat. No.03TH8659), vol. 3 ed, New Orleans, LA, USA: IEEE, 2003, pp. 1481-1486.

Neelakanta, P. S. and H. Dighe, "Robust Factory Wireless Communications: A Performance Appraisal of the Bluetooth [trademark] and the ZigBee [trademark] Colocated on an Industrial Floor", in IECON Proceedings (Industrial Electronics Conference), 3 ed, Roanoke, VA, United States: Institute of Electrical and Electronics Engineers Computer Society, 2003, pp. 2381-2386.

Choi, P., H. Park, I. Nam, K. Kang, Y Ku, S Shin, S. Park, T. Kim, H. Choi, S. Kim, S. M. Park, M. Kim, S. Park, K. Lee, "An Experimental Coin-Sized Radio for Extremely Low Power WPAN (IEEE 802.15.4) Application at 2.4GHz", in 2003 IEEE International Solid-State Circuits Conference. Digest of Technical Papers, vol. 1 ed, San Francisco, CA, USA: IEEE, 2003, pp. 92, 93, 480.

Shan, Q., Y. Liu, G. Prosser, and D. Brown, "Wireless Intelligent Sensor Networks for Refrigerated Vehicle", in Proceedings of the IEEE 6th Circuits and Systems Symposium on Emerging Technologies: Frontiers of Mobile and Wireless Communication, vol. 2 ed, Shanghai, China: IEEE, 2004, pp. 525-528.

Messerges, T. S., J. Cukier, T. A. M. Kevenaar, L. Puhl, R. Struik, and E. Callaway, "A Security Design for a General Purpose, Self-Organizing, Multihop ad hoc Wireless Network", in Proceedings of the 1st ACM Workshop on Security of Ad Hoc and Security of Ad Hoc and Sensor Networks (In Association with 10th ACM Conference on Computer and Communications Security), Fairfax, VA, United States: Association for Computing Machinery, New York, NY 10036-5701, United States, 2003, pp. 1-11.

Cavalieri, S. and D. Panno, "A Novel Solution to Interconnect FieldBus Systems Using IEEE Wireless LAN Technology", Computer Standards and Interfaces, vol. 20, No. 1, 1998, pp. 9-23.

Lee, K. C. and S. Lee, "Integrated Network of Profibus-DP and IEEE 802.11 Wireless LAN with Hard Real-Time Requirement", in IEEE International Symposium on Industrial Electronics, 3 ed, Pusan: Institute of Electrical and Electronics Engineers Inc, 2001, pp. 1484-1489.

Alves, M., E. Tovar, and F. Vasques, "Evaluating the Duration of Message Transactions in Broadcast Wired/Wireless Fieldbus Networks", in IECON Proceedings (Industrial Electronics Conference), 3 ed, Denver, CO: Institute of Electrical and Electronics Engineers Computer Society, 2001, pp. 243-248.

Willig, A. "An Architecture for Wireless Extension of PROFIBUS", in IECON Proceedings (Industrial Electronics Conference), 3 ed, Roanoke, VA, United States: Institute of Electrical and Electronics Engineers Computer Society, 2003, pp. 2369-2375.

Willig, A. "Polling-Based MAC Protocols for Improving Real-Time Performance in a Wireless PROFIBUS", IEEE Transactions on Industrial Electronics, vol. 50, No. 4, 2003, pp. 806-817.

Ferreira, L., M. Alves, and E. Tovar, "Hybrid Wired/Wireless PROFIBUS Networks Supported by Bridges/Routers", in Proceedings 4th IEEE International Workshop on Factory Communication Systems, Vasteras, Sweden: IEEE, 2002, pp. 193-202.

Miorandi D., and S. Vitturi, "Hybrid Wired/Wireless Implementations of Profibus DP: A Feasibility Study Based on Ethernet and Bluetooth", Computer Communications, vol. 27, No. 10, 2004, pp. 946-960.

Willig, A. "Investigations on MAC and Link Layer for a Wireless Profibus over IEEE 802.11", Doctoral Dissertation, University of Berlin, 2002.

Mahlknecht, S. "Virtual Wired Control Networks: A Wireless Approach with Bluetooth", in IEEE AFRICON 2002, George, South Africa: Institute of Electrical and Electronics Engineers Inc., 2002, pp. 269-272.

Morel, P., A Croisier, and J. D. Decotignie, "Requirements for Wireless Extensions of a FIP Fieldbus", in IEEE Symposium on Emerging Technologies & Factory Automation, ETFA, 1 ed, Kauai, HI, USA: IEEE, Piscataway, NJ, USA, 1996, pp. 116-122.

Morel, P. and A. Croisier, "Wireless Gateway for Fieldbus", in IEEE International Symposium on Personal, Indoor and Mobile Radio Communications, PIMRC, 1 ed, Toronto, CAN: IEEE, Piscataway, NJ, USA, 1995, pp. 105-109.

Mahlknecht, S. and P. Palensky, "Linking Control Networks and Wireless Personal Area Networks", in EFTA 2003, 2003 IEEE Conference on Emerging Technologies and Factory Automation, Proceedings, vol. 1 ed, Lisbon, Portugal: IEEE, 2003, pp. 31-36.

Rauchhaupt, L. and J. Hahniche, "Opportunities and Problems of Wireless Fieldbus Extensions", Institut fur Automation und Kommunikation c.V. Magdeburg Steinfeldstrabe, 1999, pp. 48-54.

Hasnaoui, S. "Wireless Industrial Networking Using CAN MAC-Sublayer", in Conference Record of the 2001 IEEE Industry Applications Conference, 36th IAS Annual Meeting, vol. 2 ed, Chicago, IL, USA: IEEE, 2001, pp. 1303-1310.

Jurkovic, G. and M. Zagar, "GSM Wireless Solutions in Distributed Embedded Systems Designed for Automatic Control", in Proceedings, Elmar-2004, 46th International Symposium on Electronics in Marine, Zadar, Croatia, ELMAR, 2004, pp. 205-210.

Erturk, I. "Remote Access of CAN Nodes Used in a Traffic Control System to a Central Management Unit Over Wireless ATM", in 2002 4th International Workshop on Mobile and Wireless Communications Network, Stockholm, Sweden: IEEE, 2002, pp. 626-630.

Decotignie, J. D., P. Dallemagne, and A. El-Hoiydi, "Architectures for the Interconnection of Wireless and Wireline Fieldbuses", in Fieldbus Systems and Their Applications 2001 (FeT'2001) Proceedings Volume from the 4th IFAC Conference, Nancy, France, 2001, pp. 313-318.

* cited by examiner

| BYTE 0, MSG ID | | M3 | M2 | M1 | M0 | | | |
|---|---|---|---|---|---|---|---|---|
| BIT: | 7 | 6 | 5 | 4 | 3 | 2 | 1 | 0 |

| BYTE 1, SRR, IDE | | | | SRR | 1 | | | P7 |
|---|---|---|---|---|---|---|---|---|
| BIT: | 7 | 6 | 5 | 4 | 3 | 2 | 1 | 0 |

| BYTE 2, PAN ID | P6 | P5 | P4 | P3 | P2 | P1 | P0 | C7 |
|---|---|---|---|---|---|---|---|---|
| BIT: | 7 | 6 | 5 | 4 | 3 | 2 | 1 | 0 |

| BYTE 3, CAN ID | C6 | C5 | C4 | C3 | C2 | C1 | C0 | RTR |
|---|---|---|---|---|---|---|---|---|
| BIT: | 7 | 6 | 5 | 4 | 3 | 2 | 1 | 0 |

FIG. 12

EXTENSION OF WIRED CONTROLLER AREA NETWORKS TO WIRELESS PERSONAL AREA NETWORKS

CROSS REFERENCE TO RELATED APPLICATIONS

This application claims the benefit of U.S. Provisional Application No. 60/892,094, filed Feb. 28, 2007, entitled "Extension of Wired Controller Area Networks to Wireless Personal Area Networks," having named inventor Paul A. Kuban, the disclosure of which is hereby incorporated by reference.

BACKGROUND

Developed by Robert Bosch, GmBH, in 1991, the Controller Area Network (CAN) is employed widely in modern automobiles, medical instrumentation, tactical vehicles, building automation, metropolitan transportation, and manufacturing control systems. DeviceNet is one example of a commercial Supervisory Control And Data Acquisition (SCADA) network that is based on the CAN specification. The system is used extensively to link subsystems and sensors using a simple low-cost, two-wire, hot-swappable network. Many infrastructure control systems make use of a CAN or CAN-like network at some point in their layout for connecting remote sensors to indicators and controllers to actuators, or to link multiple controllers to a common user interface.

The CAN protocol continues to experience widespread use in modern electronic systems. Several high-tier European and Japanese automobile models which use CAN are currently available. In automobiles, the CAN system is employed as the Intravehicle Network, or IVN, and may be used for everything from engine control to stereo audio distribution. Other automotive applications include A/C and heating, lighting control, and entertainment/infotainment systems. In addition to standard automobiles, CAN is employed in trucks, for truck-to-trailer communication; in trains, for door units, brake controllers, and ticket validation devices; in maritime electronics, to control pumps and valves; in aircraft, for flight sensors and navigation systems; in medical equipment, for operating room equipment management; and in factory automation systems, for process control and remote data acquisition.

The IEEE 802.15.4 wireless standard was finalized in late 2003. Commercially known as "ZigBee," this system is designed to operate at low data rates with secure, low cost network configurations. Such a network is commonly referred to as a low-rate wireless personal area network (PAN). PAN networks are often used for home networking, medical instrumentation, and other applications which desire very low power remote sensors in order to optimize battery life and minimize sensor maintenance. Two elements of the IEEE 802.15.4 low-rate wireless PAN standard are low power operation and inherent security implementation.

The IEEE 802.15.4 standard specifies the Medium Access Control (MAC) and Physical (PHY) layers of the protocol stack. The PHY layer provides the analog RF link between two communicating nodes. In particular, the PHY layer of a low-rate wireless PAN network uses direct sequence spread spectrum (DSSS) which offers inherent jamming resistance. The MAC layer defines the frame structure of the message packet, and the handshaking involved in establishing a connection. The IEEE 802.15.4 standard PAN further utilizes a time-slotted Carrier Sense Multiple Access—Collision Avoidance (CSMA-CA) mechanism. Security features are also implemented and include the ability to maintain an Access Control List (ACL) and the ability to perform symmetric cryptography.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 12 shows an embodiment of a CAN data frame in which a CAN identifier, PAN identifier, and message type have been embedded in the arbitration field of the CAN data frame.

DETAILED DESCRIPTION

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
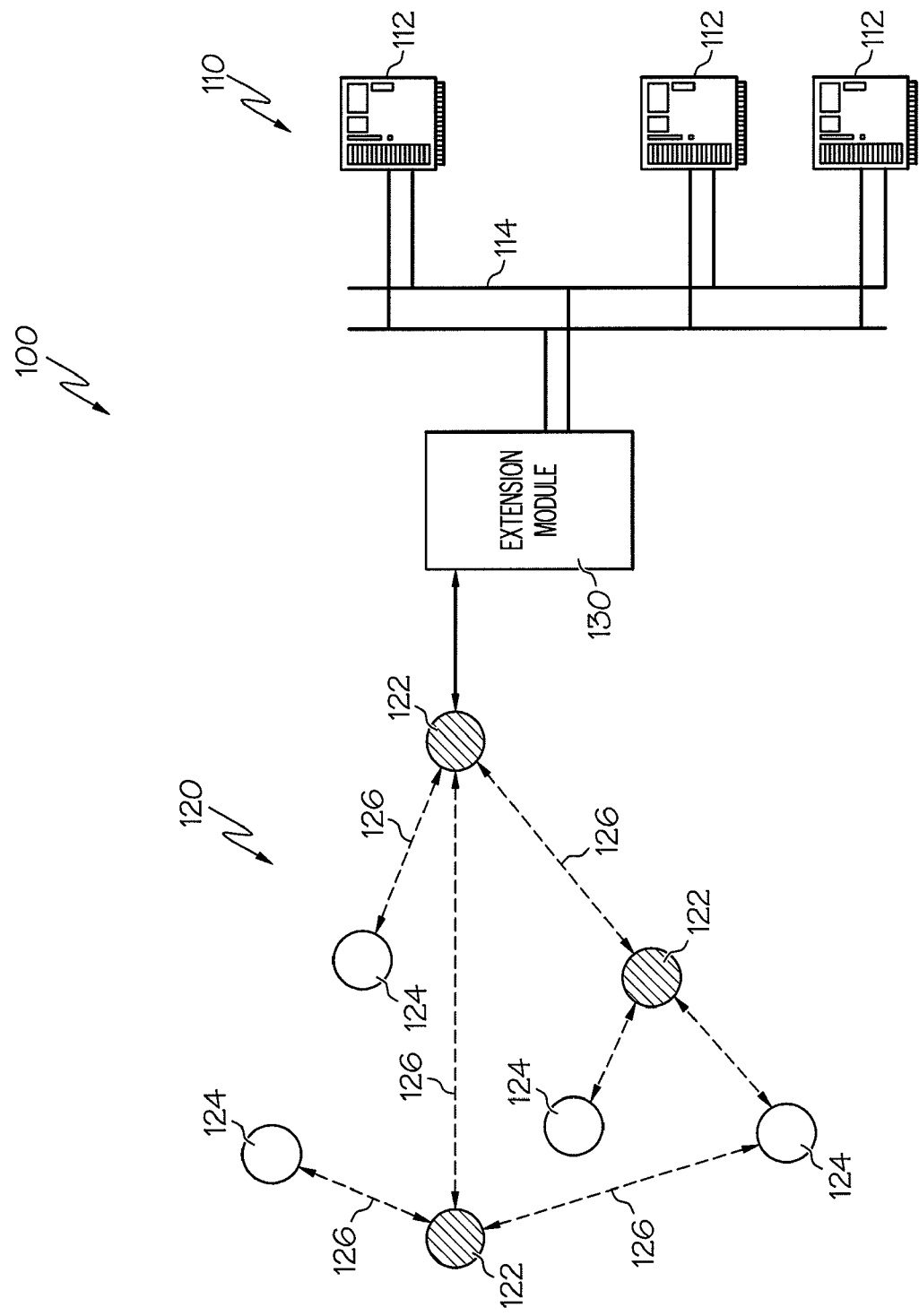
FIG. 1 shows an embodiment of a system having an extension module that extends a wired controller area network (CAN) to a wireless personal area network (PAN).

Referring now to FIG. 1, an embodiment of a system 100 is shown that includes a wired network 110, a wireless network 120, and an extension module 130 to operatively couple the wired network 110 with the wireless network 120. In one embodiment, the wired network comprises a CAN network and the wireless network 120 comprises an IEEE 802.15.4 low-rate wireless PAN. Aspects of the extension module 130 may be employed to operatively couple networks other than the above mentioned CAN network and PAN network; however, to simplify the following description, the extension module 130 is described herein as operatively coupling a wired CAN network 110 with a wireless PAN network 120.

The extension module 130 extends the CAN network 110 to the PAN network 120. The extension module 130 addresses heterogeneous nature of these two networks in order to establish a gateway therebetween. Some of the heterogeneous aspects addressed by the extension module 130 are shown in Table 1.

TABLE 1

| | Controller Area Network | IEEE 802.15.4 PAN |
| --- | --- | --- |
| Physical Layer | wired bus with terminators | spread spectrum RF |
| MAC/LLC Layer | message filters | source and destination addresses |
| MAC Layer | collision detection | collision avoidance |
| Network Layer/ Topology | parallel nodes, boss-worker | ad-hoc, Full Function Devices, Reduced Function Devices |
| Security | none | Access Control Lists, Symmetric Cryptography |

The CAN network 110 includes a bus 114 to interconnect devices 112 such as sensors, indicators, controllers, actuators, and user interfaces. The bus 114 in one embodiment operates at relatively low data rates over a simple twisted pair, but other connection mechanisms are permitted according to the physical layer standard which is specified in ISO 11898.

Each device 112 of the CAN network 110 may send and receive messages if the bus 114 is free. Unlike the distinct source/destination addressing schemes found in common protocols such as Internet Protocol (IP), one unique aspect of the CAN protocol is the use of message filters rather than hard coded addresses. Each node (e.g. devices 112 and extension module 130) on the CAN network 110 may determine if a message is meant for the node based on whether or not a predetermined filter matches with the data in the identifier field of the received frame. Message filters enable simple broadcast or multicast messages, in which one node 112, 130 may send the same message to many nodes 112, 130, a potentially useful feature for a "boss-worker" distributed processing architecture.

The PAN network 120 may be arranged in either star or peer-to-peer network formations, operating under the supervision of a personal area network (PAN) coordinator node. As shown in FIG. 1, the PAN network 120 may include full-function devices (FFD) 122 and a reduced-function device (RFD) 124 that are interconnected via radio frequency (RF) links 126. An FFD device 122 may function as a PAN coordinator or as a device, and communicate with RFD devices 124 and other FFD devices 122. An RFD device 124 may only talk to an FFD device 122 and is used at a termination point, as with a simple sensor or actuator.

Figure 2:
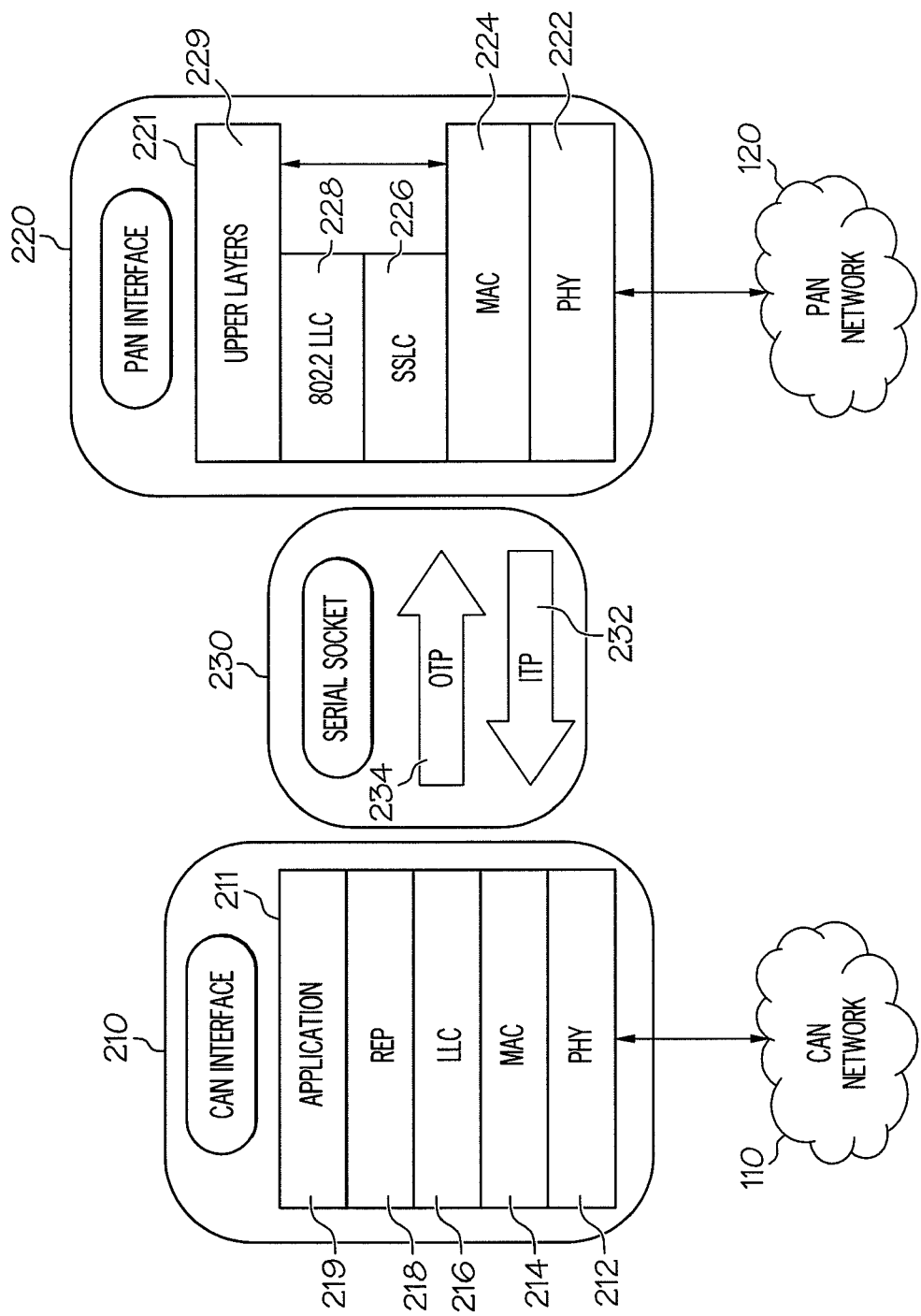
FIG. 2 shows an embodiment of the extension module of FIG. 1.

An embodiment of the extension module 130 is illustrated in FIG. 2. In particular, the extension module 130 includes a CAN extension interface 210, a PAN extension interface 220, and a serial socket 230 that provides a serial communications interface between the CAN extension interface 210 and the PAN extension interface 220. In a development implementation, the CAN extension interface 210 was implemented using a CML12S-DP256 development board from Axiom, Inc and the PAN extension interface 220 was implemented using a Freescale Sensor Application Reference Design or SARD card.

The CML12S-DP256 development board used in one implementation of the CAN extension interface 210 houses a Freescale MC9S12DP256B processor and includes 11 KB of RAM, 3K of EEPROM and 4KB FLASH memory. The processor of the development board also features 4 CAN ports, 2 SPI (serial peripheral interface) ports, 2 SCI (serial communication interface) ports, several general purpose IO ports, 8 channels of analog-to-digital conversion, and extensive timing and signal detection circuitry.

The Freescale SARD card used in one implementation of the PAN extension interface 220 includes a MC13192 RF transceiver which is an IEEE 802.15.4 compliant radio frequency interface chip (RFIC). The SARD card further includes a Freescale HCS08 processor. The processor of the SARD card has 64K of on-board FLASH, A/D conversion, 1 SPI port, 2 SCI ports, programmable PLL, BDM, and general purpose IO. The processor may send and receive PAN RF messages through its SPI port over the MC13192 RF transceiver of the SARD card.

In one embodiment, the serial socket 230 is implemented using SCI ports of the CAN and PAN extension processors. In particular, the PAN extension processor may transfer raw data over its SCI port to and from the CAN extension processor. In one embodiment, the serial transfer occurs asynchronously over a fixed null-modem connector which also forms the physical connection between the PAN extension processor and the CAN extension processor.

From the perspective of manufacturing cost, the dual processor hardware architecture of the development board may be eliminated. While the dual processor structure significantly streamlined software development, the dual processor structure also essentially doubled the fixed hardware cost. The move to a single chip architecture may include one of two options: a port of the 802.15.4 protocol stack to a processor which contains a CAN block, or the addition of a CAN hardware block to a processor which is supported by the currently available software. In either of these cases, a physical serial link for the serial socket 230 may be circumvented, thus saving about 0.4 ms of message transfer time in both directions.

As shown, the CAN protocol stack 211 includes a physical (PHY) layer 212, a media access control (MAC) layer 214, and a logical link control (LLC) layer 216. Furthermore, the PAN protocol stack 221 is shown with a PHY layer 222, a MAC layer 224, an SSLC layer 226, an LLC layer 228, and upper layers 229. In one embodiment, the extension module 130 is implemented as an encapsulation bridge. A bridge operates at the data link layer and receives a complete MAC or LLC frame. There are several different types of bridges: passthrough, translation, and encapsulation. A passthrough bridge is used when both sides have identical data link layer functionality, since frames may be passed unchanged. A translation bridge is used when both sides have link layer similarities sufficient to allow for direct translation. An encapsulation bridge (a.k.a. tunnel) is used when simple translation is not possible. In particular, the extension module 130 encapsulates a data frame from one protocol stack 211, 221 within a frame of the other protocol. However, in one embodiment of the extension module 130, the definition of an encapsulation bridge is slightly modified to allow for higher layer handshaking and security handlers.

The present embodiment of the extension model 130 breaks up the CAN protocol stack 211 into a physical (PHY) layer 212 and data link layers, with the data link layer being divided into the Logical Link Control (LLC) layer 216 and a Medium Access Control (MAC) layers 214. Table 2 depicts the organization of the CAN protocol stack 211 and the associated layer responsibilities.

TABLE 2

| Layer | All Nodes | Supervisory Nodes |
| --- | --- | --- |
| Application (APP) | User programs | |
| Logical Link Control (LLC) | ID filtering, overload notification, recovery management | fault confinement |
| Medium Access Control (MAC) | frame coding and formatting, error signaling and detection, acknowledgements | fault confinement |
| Physical (PHY) | bit timing, synchronization bit encoding and decoding | bus failure management |

Turning to the CAN protocol stack 211 in more detail, the PHY layer 212 of the CAN protocol stack 211 handles synchronization, bit timing and coding, and the actual physical link between two network entities. Although other connection methods are utilized, the predominant PHY layer 212 implementation is a simple twisted pair, terminated at each end with a 124 Ohm resistor. Functionally, each CAN bus node 112, 130 may be viewed as a switch connected to a transistor with a pull-up resistor, thus forcing the bus 114 to a state which is essentially the logical "AND" of all contending bits. The logical states of the bus 114 are dominant and recessive. The dominant state corresponds with a logical "zero" which forces the bus 114 to its zero state regardless of how many logical "ones" are contending for the bus 114. This mechanism is used to provide the bus master 130 with priority over subordinate nodes 112 and for arbitration among nodes 112 of equal rank. If the bus 114 is free, any node may begin transmitting a new message. If simultaneous transmissions are attempted, the bus conflict is resolved using the bits in the identifier field of the message. All messages on the bus 114 are received (but not necessarily processed) by all connected nodes 112, 130. Each node 112, 130 acknowledges consistent (correct) messages and flags inconsistent messages. This ensures the reliability of the link by providing a handshake-like logic to the sender. In most cases, the lower CAN layers are implemented in hardware with integrated interrupt logic that allows for a sleep mode with automatic wakeup when activity on the bus 114 resumes.

The MAC layer 214 of the CAN protocol stack 211 is responsible for frame coding and formatting, error signaling and detection, and acknowledgements. Each active node 112, 130 performs bus monitoring, cyclic redundancy checks (CRC), bit-stuffing, and message frame checks. Global and local errors may be detected by nodes 112, 130. When errors are detected, the message is aborted and automatically retransmitted until either a successful reception is accomplished or the offending node 112, 130 is suspended from the bus 114.

Figure 3:
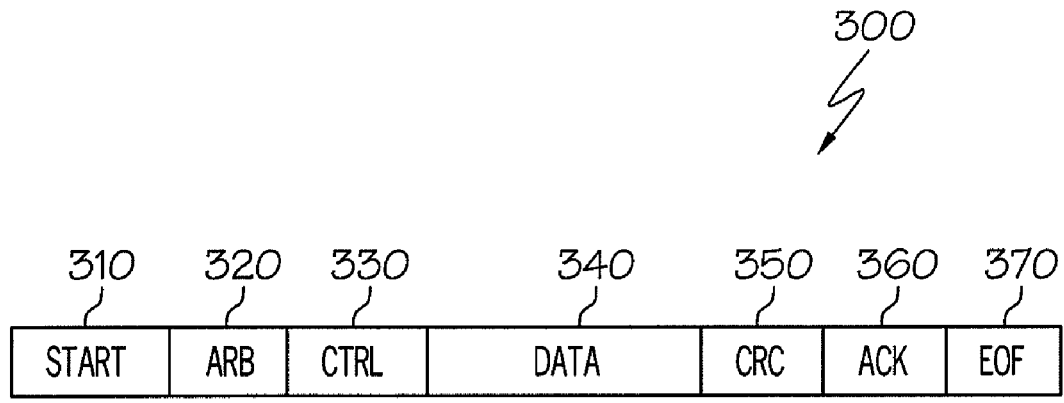
FIG. 3 shows an embodiment of a CAN data frame structure.

CAN frames are categorized into four different types: data, remote, error, and overload. A data frame contains the message information. A remote frame occurs when a node requests other nodes 112, 130 to transmit data frames with its identifier. Error frames are generated when a node 112, 130 detects errors. Overload frames provide additional delay between successive data or remote frames. The seven-fields of a CAN data frame 300 are shown in FIG. 3. The start field 310 consists of a single dominant bit and its edge is used as the trigger for synchronization of the remaining bits in the frame 300.

Figure 4:
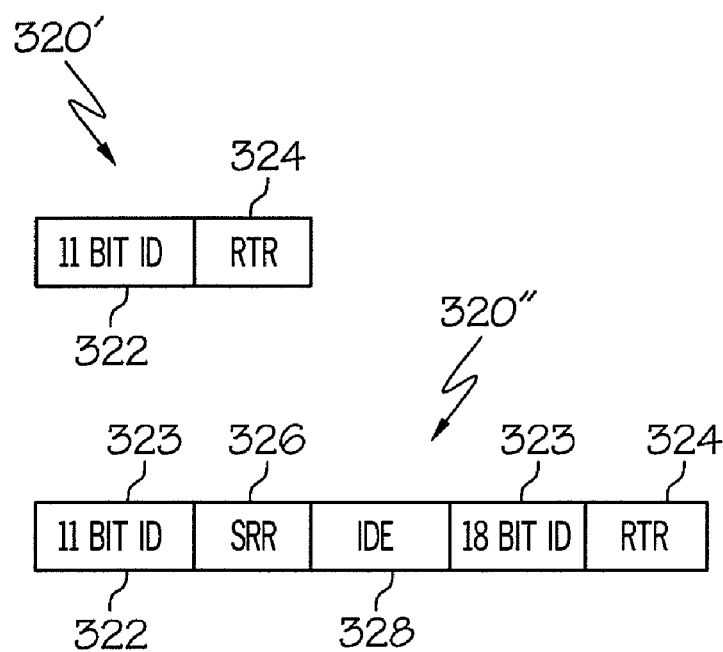
FIG. 4 shows an embodiment of a standard arbitration field and an extended arbitration field of a CAN data frame.

The arbitration field 320 varies depending on whether the frame is standard format or extended format frame. As shown in FIG. 4, the standard arbitration field 320' uses a single 11-bit identifier 322 which forms the basis for prioritization; the smaller number wins in a contentious correspondence. The extended frame field 320" uses a total of 29 bits for the identifier 323, but only the first 11 bits 322 are used for priority decisions. The state of the RTR (remote transmission request) bit 324 is determined by the frame type. It is dominant in a data frame and recessive in a remote frame. Because the SRR (substitute remote request) bit 326 of the extended arbitration field 320" occupies the same position as the RTR in a standard arbitration field 320', collisions may occur between a standard frame and extended frame with the same 11-bit base ID 322. In this case, the standard frame has priority. The function of the IDE (identifier extension) bit 328 also varies with frame format. In extended format frames, the IDE bit 328 is used in the arbitration field 320. In the standard format, it is used as part of the control field 330.

The control field 330 includes some reserved bits as well as 4-bit data length code. The data length code specifies the length of the message in bytes, using a simple binary count, from $0000_2$ (0 data bytes) to $1000_2$ (8 data bytes), where "0" is a dominant bit and a "1" is a recessive bit. The data field 340 in both standard and extended data frames can contain from zero to eight bytes of information. The CRC field 350 contains the CRC sequence and recessive CRC delimiter bit. The CRC sequence is generated using all of the previous frame bits appended with 15 zero bits.

A remote frame structure resembles a data frame without the data field. It is used to request a transmitter to send data to a receiver. An error frame contains the error flag and eight recessive error delimiter bits. The error flag field is the superposition of all the error flags currently being transmitted. An active error is indicated by six consecutive dominant bits; a passive error flag is indicated by six consecutive recessive bits, unless these bits are overwritten by other nodes transmitting dominant bits for active error flags. Overload frames function similarly to error frames; they have an overload flag field which is the superposition of all nodes' flags followed by a delimiter of eight recessive bits. In addition to the four frame types, data and remote frames are separated by an interframe space. The purpose of this space is to allow for the bus 114 to become idle long enough for nodes 112, 130 to sense the idle condition and either to begin new messages, or suspend transmission activity.

The LLC layer 216 of the CAN protocol stack 211 may perform the following tasks: identifier filtering, overload notification, and recovery management. When compared with typical network protocols, the most unique feature of CAN is the method with which nodes 112, 130 are addressed. Rather than a specific source and destination address, identifiers are included in the message packet. This identifier field 322 is processed by all receiving nodes 112,130 on the network bus 114. The receivers use preconfigured filters to decide whether or not to act upon a message. The filter logic performs a bit-by-bit check (compare) of the inbound identifier and its own filter bank. If a match occurs, the message is processed, otherwise the message is ignored.

If such a situation is warranted, the CAN nodes 112, 130 permit "don't care" bits in a mask register to be configured, which permits supervisory nodes to collect messages from many identifiers (subordinates), while at the same time preventing subordinates from communicating with each other. Such an arrangement is commonly referred to as the "boss-worker" model for distributed processing, which is well-suited in an automotive or industrial environment where many distributed sensors are communicating with one central controller. The filter bank field is 32 bits wide and may be configured as two, four, or eight acceptance filters. The choice of filter configuration is based on whether standard frame or extended frame formats are used and on the desired network organization. The most straightforward example of filter use is with the two-bank full width filter. In this case, the entire 29 bits of the received identifier (adding the RTR, IDE, and SRR bits yields 32 total bits) are first passed through the optional 32-bit mask, bank 1. The output of the mask bank is then passed through the receive filter, bank 2. If all the bits match, a "hit" is generated and the receiver will process the message.

The additional filter configurations allow for multiple hits, with one hit possible for each configured filter bank. This feature is useful for implementing a group-wise communication hierarchy within the network. Because the configuration possibilities are immense, a third-party application is often used to set the filter parameters.

Another function of the LLC layer 216 is bit-stuffing. In order to maintain an adequate number of edge transitions (for clock recovery and to prevent DC wander), no more than five consecutive identical bits are allowed. The LLC layer 216 in the transmitter automatically inserts a complementary bit in the field after detecting five consecutive identical bits. This action only occurs on the start 310, arbitration 320, control 330, data 340, and CRC 350 sequence. Bit-stuffing does not occur on the CRC delimiter, acknowledgement 360, or end of frame (EOF) field 370.

The fault containment and recovery management schemes are based on individual error counters and the variable error states of each node 112, 130. There are five kinds of errors that can occur during a transmission: a "bit error" occurs when a transmitter detects a bit on the bus 114 which is different from the bit being sent; a "stuff error" occurs when six consecutive identical bits are detected in a field; a "CRC error" occurs when the received CRC calculation does not match the transmitted CRC sequence; a "form error" occurs when a field contains more bits than expected; and an "acknowledgement error" occurs when a transmitter does not detect an acknowledgement (ACK) after sending a message. The validity of a message is interpreted differently for transmitters and receivers. A transmitter considers a message to be error free if there are no errors until the end of the frame 370. If any errors do occur, the message is re-transmitted automatically, based on priority rules. A receiver considers a message-error-free if all except the final bit of the frame are uncorrupted.

Every node 112, 130 on the CAN bus 114 may maintain two error counters—a receiver error counter and a transmitter error counter. In addition, each node 112, 130 is assigned one of three error states: active, passive, or bus-off. The active state is the normal state in which a node sends active error flags (dominant) upon detection. Nodes 112 in the passive state may only send passive flags (recessive). A bus-off node 112 cannot send any error flags. The error counters are incremented and decremented in varying degrees based on the type of error detected and the error state of the node. The error state of each node is determined by the value of the error counters. Generally speaking, nodes 112 with high error counts may be put in the passive state or even "pulled-off" of the bus 114. If their error counts are reduced to an acceptable level they are allowed to rejoin the bus 114 in the active state.

As mentioned above, the PAN protocol stack 221 includes a PHY layer 222, a MAC layer 224, an SSLC layer 226, an LLC layer 228, and upper layers 229. The PHY layer 222 operates at relatively low data rates, between 20 kbps and 250 kbps, in several bands. There are 16 channels allocated in the 2450 MHz band, 10 channels in the 900 MHz band, and 1 channel at 868 MHz. Channels are numbered 0 through 26, with channels 11 through 26 occupying the 2450 MHz band. In the lower frequency bands, the modulation symbols are binary; therefore the symbol rate (symbols/second) and bit rate (bits/second) are both 20k. The high frequency band uses a 16-ary orthogonal modulation (4 bits/symbol). The bit rate is 250k bits/second and the symbol rate is 62.5 symbols/second. The maximum packet size is limited to 127 bytes. A spread spectrum modulation is employed, which provides for a minimum jamming resistance of 30 dB.

The MAC layer 224 of the PAN protocol stack 221 uses a Carrier Sense Multiple Access—Collision Avoidance (CSMA-CA) mechanism for channel access and provides for fully acknowledged message transfer to ensure reliability. The MAC layer 224 in one embodiment provides the following services: Beacon Management, Channel Access, Guaranteed Time Slot (GTS) Management, Frame Validation, Acknowledgements of Frame Delivery, Network Association and Disassociation.

Within each PAN transmission, there are four different types of frame structures possible. Beacon frames are used by coordinators for synchronization and for network association. Data frames carry the message information. Acknowledgement frames confirm the successful reception of a frame. MAC command frames handle peer entity control transfers.

Figure 5:
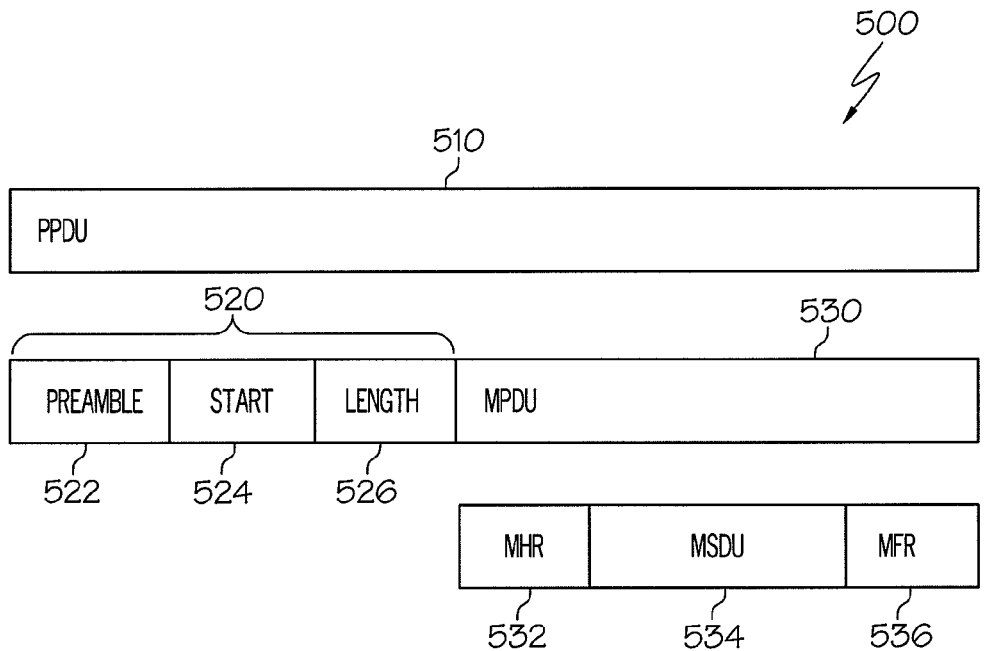
FIG. 5 shows an embodiment of a PAN frame structure.
Figure 6:
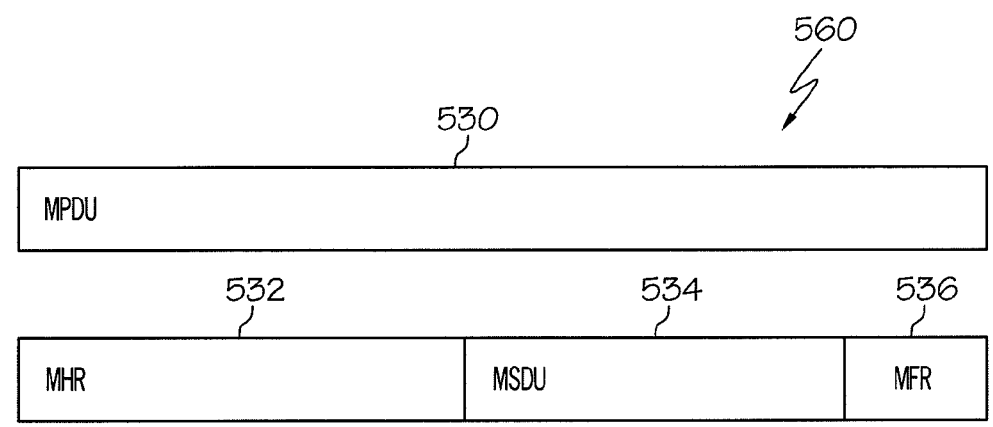
FIG. 6 shows MAC fields of an embodiment of a PAN beacon frame.
Figure 6:
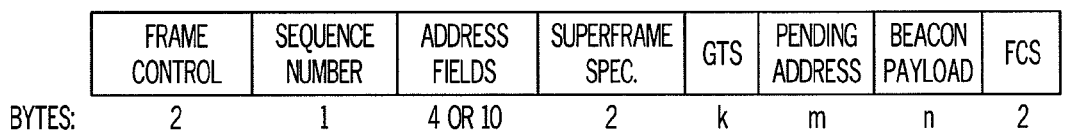

The general structure of a PAN frame 500 is shown in FIG. 5. At the highest level, the physical protocol data unit (PPDU) 510 embodies the entire frame 500. The PPDU 510 may be broken down into a PHY segment 520 and a MAC segment 530, also known as the MAC protocol data unit (MPDU). The PHY segment 520 includes a preamble field 522 (4 bytes), a start delimiter 524 (1 byte), and a frame length indicator 526 (1 byte). The PHY segment 520 is common to all four frame types. The MPDU 530 contains the MAC header (MHR) 532, the MAC service data unit (MSDU) 534, and the MAC footer (MFR) 536. An expansion of the MPDU 530 is shown in FIG. 6 to illustrate the MAC portion of a beacon frame 560.

Figure 7:
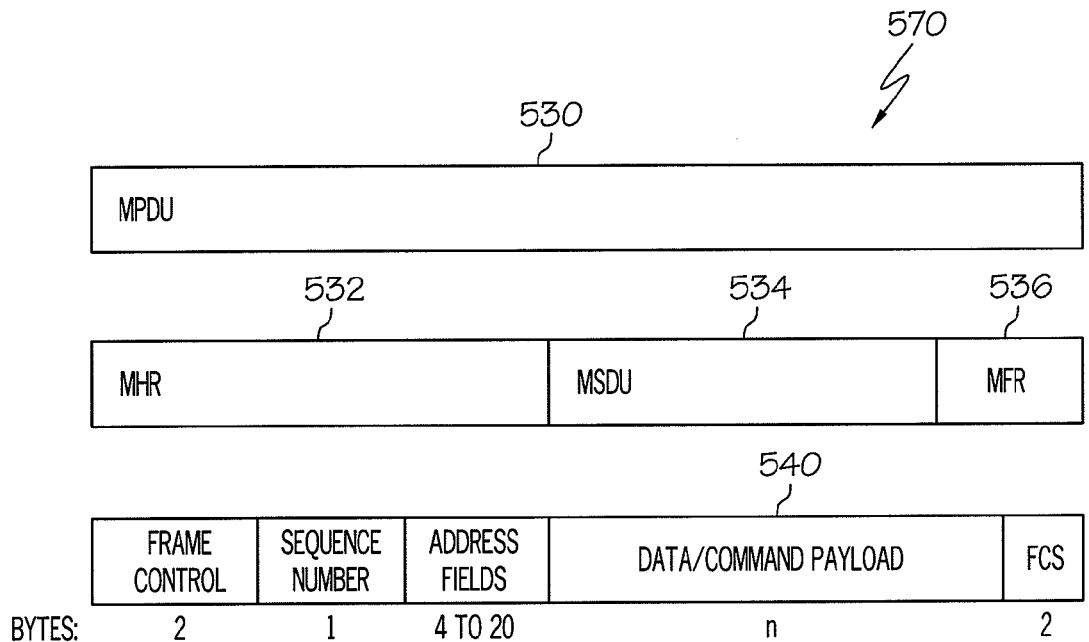
FIG. 7 shows MAC fields of an embodiment of a PAN data frame and a PAN command frame.

The MAC portion of a data/command frame 570 is shown in FIG. 7. The difference in the organization of the data frame and a command frame is the payload field 540. However, the data payload field 540 is originated in higher layers (e.g. layer 229) and passed down to the MAC layer 224, whereas the command payload field 540 is generated within the MAC layer 224. MAC commands are used by network entities such as the FFD devices 122 and the RFD devices 124 for most activities including association and disassociation, beacon notification, synchronization, time slot management, and data requests.

Figure 8:
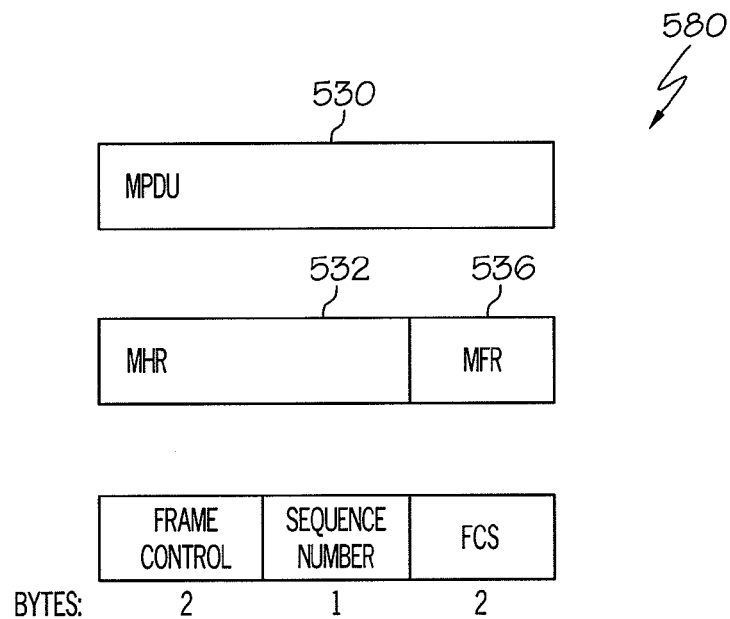
FIG. 8 shows MAC fields of an embodiment of a PAN acknowledgement frame.

An acknowledgement frame 580 is considerably smaller than the three previously mentioned frames, containing only 5 bytes in its MPDU 530, as shown in FIG. 8. Acknowledgement frames 580 are used to confirm the reception and validation of a MAC command frame 570 or data frame 570. Acknowledgement frames 580 are optional; if so enabled, the transmitter will resend a message if an acknowledgement is not received within the timeout period. The sender may also decide to terminate the message after several unsuccessful retries.

The PAN MAC layer 224 may also provide basic security measures, including the ability to maintain an access control list and to provide for symmetric cryptography. The actual implementation of security features, such as key management and authentication may be implement by higher layers (e.g. SSLC layer 226, upper layers 229).

The PAN protocol stack 221 may provide access control, data encryption, frame integrity, and sequential freshness. Under access control, each device 122, 124 maintains a list of devices with which communication is desired. Frames from undesired devices are rejected. Data encryption may be performed on the payload field of beacon, command, and data frames. Symmetric cryptography implies the use of a single key at both ends of the communication. This key may be shared by a group of devices 122, 124, 130 or by two communicating peers 122, 124, 120 within their respective ACLs. A message integrity code (MIC) is used to ensure frame integrity. Modification of this code depends upon the cryptographic key, hence this code prevents unauthorized frame modification and assures the reliability of the frame source. The sequential freshness mechanism applies an ordered numerical sequence on transmitted frames. The receiver is then able to determine if a frame is new or if it has been re-sent, in which case the re-sent frame can be rejected.

As may be appreciated from the above description of the PAN network 120 and the PAN protocol stack 221, the PAN network 120 provides for connection-oriented, reliable data transfers by specifying acknowledged message delivery. However, as also may be appreciated from the above description of the CAN network 110 and the CAN protocol stack 211, acknowledgements occur on the CAN network 110 as a single bit within the given message. Each node 112, 130 of the CAN network 110 simultaneously asserts this single bit of the message upon receipt resulted in an "ANDed" condition of the acknowledgement bits of the nodes 112, 130 on the bus 114.

Thus, unless otherwise addressed by the extension module 130, a message sent by a node 112 of the CAN network 110 to a target device 122 of the PAN network 120 may be acknowledged by the extension module 130 upon receipt prior to being received by a target device 122, 124 of the PAN network 120. Due to unavailability of the target device 122, 124, a PAN network failure, network interference, or some other cause, the target device 122, 124 may not receive the message. Thus, the sending node 112 of the CAN network 110 may receive an acknowledgement which the sending node 112 interprets as successful receipt of the message by the target device 122, 124, but the target device 122 may never in fact receive the message. Therefore, the extension module 130 in one embodiment adds a Reliability Enhancement Protocol (REP) layer to the CAN protocol stack 211 to handle handshaking acknowledgements between the CAN network 110 and the PAN network 120.

As shown, the extension module 130 in one embodiment further includes a reliability enhancement protocol layer (REP) 218, an inbound tunneling protocol (ITP) layer 232, and an outbound tunneling protocol (OTP) layer 234. The REP layer 218 generally provides an information transmission procedure between collision-avoidance-oriented nodes and collision-detection-based nodes. The ITP layer 232 handles serial transfers from the PAN network 120 to the CAN network 110. Generally, the ITP layer 232 strips the preamble, header, and any other data which is not part of the message, then reformats the message to be suitable for the CAN network 110 and appends a CAN message identifier. Conversely, the OTP layer 234 handles serial transfers from the CAN network 110 to the PAN network 120. Generally, the OTP layer 234 formats any CAN-related arbitration fields, decodes the message identifier, selects the transmit options, then appends the appropriate PAN header and preamble bits.

One aspect of the extension module 130 is to convert from/to the spread spectrum RF signal of the PAN network 120 to/from the two-wire bus 114 of the CAN network 110. In one embodiment, the extension module 130 utilizes a PAN protocol stack 221 such as a ZigBee protocol stack available from various vendors that acquires a PAN RF signal and converts it to a serial data stream. The extension module 130 thus translates and formats the serial data stream. The extension module 130 further buffers the inbound data prior to translation, as well as outbound formatted data. The extension module 130 utilizes buffers having lengths that account for difference in data rate between inbound and outbound streams, processing time of the translation, and any additional reliability requirements which result in the storage of multiple or redundant messages.

At the MAC layer, the extension module 130 establishes connections, extracts messages from packets, converts between fixed addressing of the PAN network 120 and message filter bits of the CAN network 110, and ensures reliable data transfer between the CAN network 110 and the PAN network 120. As shown in FIG. 2, the extension module 130 uses a layered approach to establish connections between the CAN network 110 and the PAN network 120. In one embodiment, the extension module 130 is implemented as FFD device of the PAN network 120 that includes a layered CAN protocol stack 211 connected to a layered PAN protocol stack 221 via a serial socket connection 230. This architecture of the extension module 130 allows for the CAN MAC layer 214 and the PAN MAC layer 224 to operate independently with regard to association and network management, but also allows for data transfer over the serial socket 230.

Once a session is established, the extension module 130 may remove the preamble and header from an inbound frame in order to extract the information from the message. Likewise, the extension module 130 may append the appropriate preamble and header to outbound packets. In one embodiment, extension module 130 does not extend the PAN security mechanisms to the wired CAN network. In particular, the PAN protocol stack 221 of the extension module 130 decrypts encrypted messages received from the wireless PAN network 120 and passes clear data onto the CAN network 110 via the serial socket 230 and the CAN protocol stack 211. Conversely, CAN protocol stack 211 of the extension module 130 receives clear data from the CAN network 110 and passes such clear data to the PAN protocol stack 221 via the serial socket 230. The PAN protocol stack 221 in turn encrypts the data prior to transferring to the PAN network 120.

The extension module 130 further converts source and destination addresses of the PAN network 120 having a fixed source/destination address to an appropriate filter setting in the CAN message and vice-versa. Since these fields are of different bit lengths, the extension module 130 uses a tunneling protocol to provide for inbound and outbound transformations. In particular the tunneling protocol, encapsulates outbound CAN frames within the payload portion of PAN frames. In one embodiment, the extension module 130 uses a uniform-length CAN frame mainly for simplicity of design and analysis in which each CAN message contains 4 address bytes and 8 data bytes. Other embodiments, of the extension module 130 may use variable length CAN frames.

Because of the heterogeneity in the CAN and PAN frame construction, substantial processing is involved to transfer data between the CAN network 110 and the PAN network 120. Accordingly, the extension module 130 includes independent tunneling protocol layers to handle inbound messages to the CAN network 110 and outbound message from the CAN network 110, respectively referred to as an inbound tunneling protocol (ITP) layer 232 and an outbound tunneling protocol (OTP) layer 234. The ITP layer 232 and OTP layer 234 in general address data rate, address mapping, multi-cast messaging vs. single recipient transactions, and frame segmentation issues associated with transferring data between the heterogeneous CAN and PAN networks 110, 120.

The tunneling protocol layers 232, 234 are substantially simplified by the establishment of a serial socket 230 for passing data between the CAN protocol stack 211 and PAN protocol stack 221 of the extension module 130. Although the use of the serial socket 230 adds some additional message latency, the serial socket 230 permits completely independent operation of each protocol stack 211, 221.

For non-critical data transfer (e.g., convenience indicators) the extension module 130 may make use of the CSMA algorithm within the contention access period (CAP) of a beacon-enabled network, or during idle periods in a non-beacon enabled network. For critical data transfers in which determinism is desired, another approach is used. In one embodiment, the extension module 130 implements encapsulation of CAN frames in data payload 540 of the PAN PDU 510 and utilization of the IEEE 802.15.4 guaranteed time slot (GTS) mechanism for establishing a connection-oriented service for critical data streams. Encapsulation of the CAN frames and use of the GTS mechanism circumvents the typical CSMA schemes found in most other wireless solutions (802.11, BlueTooth) and provides guaranteed bandwidth over the channel.

In one embodiment, the tunneling protocol further uses extended CAN message format to allow for larger addressing space. Note, the data part of a CAN message is limited to a maximum of 8 bytes. As noted above, extended format simply increases the size of the identifier field from 11 bits to 29 bits, which allows for more potential identifiers within a network.

In order to increase message throughput, the tunneling protocol further embeds the CAN identifier, PAN identifier, and message identifier within the arbitration field 320 of a CAN data frame 300, thus leaving all of the data field 340 available for message content. In particular, to accommodate the inclusion of the PAN ID and message type in the CAN arbitration field 320, the extended arbitration format was adopted for one embodiment. For one embodiment, the extended arbitration field 320" is 4 bytes long and is formatted as shown in FIG. 12. It should also be noted that in arrangement of FIG. 12, the message ID bits would form the CAN base identifier which is used for message prioritization. If a particular implementation required the CAN identifier be within the 11 bit identifier field 322, the format could be adapted. The shown frame format permits an 8-bit CAN identifier (C0-C7), an 8-bit PAN address (P0-P7), and a 4-bit message type indicator (M0-M4).

The message types established for testing and their associated codes are:
 0×01: (Device to Coordinator) Toggle the specified LED and return an ACK.
 0×02: (Device to Coordinator) Query for the status of the LED bank.
 0×03: (Device to Coordinator) Stream 8 bytes to serial port.
 0×04: (Coordinator to Device) Message successful ACK.
 0×05: (Coordinator to Device) Response to query of LED status.
 0×06: (Device to Coordinator) Toggle the specified LED, no ACK needed.
 0×07: (Device to Coordinator) Stream 8 bytes using GTS.
 0×08: (Device to CAN) ACK Timeout or invalid response.

However, it should be appreciated that other or additional message types may be defined for a specific implementation. Furthermore, it should be appreciated that the CAN identifier, PAN identifier, and/or message type may be implemented with a different number of bits than those specified above by allocating the 29 bits of the extended identifier 323 differently among the CAN identifier, PAN identifier, and/or message type.

In one embodiment, the wireless link occurs at a network access point utilizing a Full Function Device (FFD) on PAN network side. The wireless link uses CSMA-CA. This means that the RF device listens to the channel, and if it is being used, sets an internal random "backoff" counter, which is decremented to zero before it retries. If the channel is clear, then the transmitter is free to send a message. Once it begins transmitting, it has no idea if a "hidden" node subsequently overpowers the transmission, and thus does not know if the message was successfully delivered unless it receives an acknowledgement. Since the acknowledge may also be "stepped on" by a hidden node, the transmitter could enter an unstable state, unless a time-out is provided.

The CAN network 110 uses collision detection, wherein a CAN node 112 immediately knows if the transmission was corrupted and can retry indefinitely if the bus 114 is free. This is due to two factors: 1) the wired-AND behavior of the CAN bus 114, in which any node 112 transmitting a "zero" bit pulls the bus voltage level to its dominant (zero) state, and 2) because the message acknowledgement actually occurs during message transmission, as a bit defined in the message frame.

Because of the aforementioned heterogeneity of the CAN network 110 and PAN network 120, a situation could arise in which a CAN node 112 sends a message to the extension module 130 and receives an acknowledgement, but then the extension module 130 fails to deliver the message over the wireless link. The originator, previously believing that the message succeeded, needs to be aware that the message transfer failed. In order to address the above scenario, a reliability enhancement protocol (REP) layer 218 has been introduced into the CAN stack 211 of the extension module 130 and the CAN stacks of the CAN nodes 112.

The REP layer 218 is responsible for ensuring that a CAN sender 112 is aware of the reception of the transmitted message by the appropriate receiver. Because the CAN MAC layer 214 includes inherent real-time acknowledgements, the original sender's MAC layer will assume a transaction was complete, although the message was only received by the CAN side of the extension module 130. In order to ensure that a message is delivered through the wireless link, a handshaking algorithm is used. The algorithm is best described through the use of the finite state machine shown in FIG. 9.

During the WAIT-FOR-TX-MSG-REQUEST state, the application layer 219 provides the REP layer 218 with a message to be sent to the PAN network 120 and requests the message be sent. In response to the request to transmit the message, the REP layer 218 transitions to the PROCESS-TX-MSG-REQUEST. If the application layer 219 did not request the REP layer 218 to wait for an acknowledgement (akstat=false), then the REP layer 218 transmits the message to the PAN network 120 via the OTP layer 234 of the serial socket 230 and returns to the WAIT-FOR-TX-MSG-REQUEST state to wait for the next transmit request from the application layer 219. However, if the application layer 219 did request the REP layer 218 to wait for an acknowledgement (akstat=true), then the REP layer 218 transmits the message to the PAN network 120 via the OTP layer 234 and sets various parameters before transitioning to the WAIT-FOR-ACK state. In particular, the REP layer 218 may record an acknowledgement identifier (ackid) for the message. The REP layer 218 may further set a retry count (e.g. 4) and start a timeout timer.

As messages are received from other nodes 112, 130 during the WAIT-FOR-ACK state, the REP layer 218 determines whether the received message has an acknowledgement identifier that matches the recorded acknowledgement identifier. If the acknowledgement identifiers match, then the REP layer 218 stops the timeout timer and returns to the WAIT-FOR-TX-MSG-REQUEST state to wait for the next transmit request from the application layer 219. If the timeout timer expires prior to receiving a message having a matching acknowledgement identifier and retries remain, then the REP layer 218 restarts the timeout timer, decrements a retry value, resends the message to the PAN network 120 via the OTP layer 234 and stays in the WAIT-FOR-ACK state in order to wait for an acknowledgement to the resent message. However, if the timeout timer expires prior to receiving a message having a matching acknowledgement identifier and no more retries remain, then the REP layer 218 sends a no acknowledgement message to the CAN network 110 via the CAN protocol stack 211 and returns to the WAIT-FOR-TX-MSG-REQUEST state to wait for the next transmission request.

Figure 9:
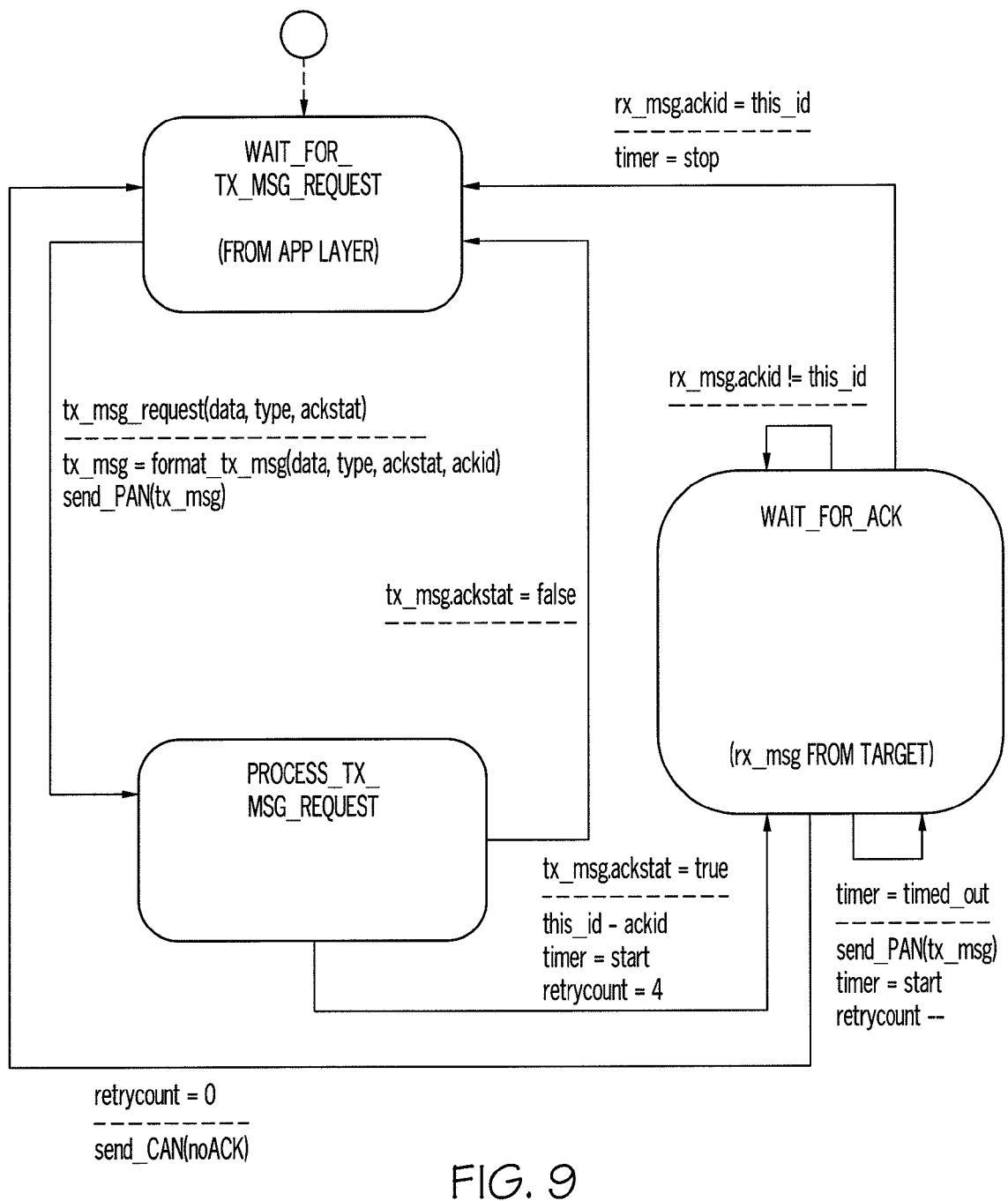
FIG. 9 shows an embodiment of a finite state machine for a reliability enhancement protocol (REP) used by message originator.
Figure 10:
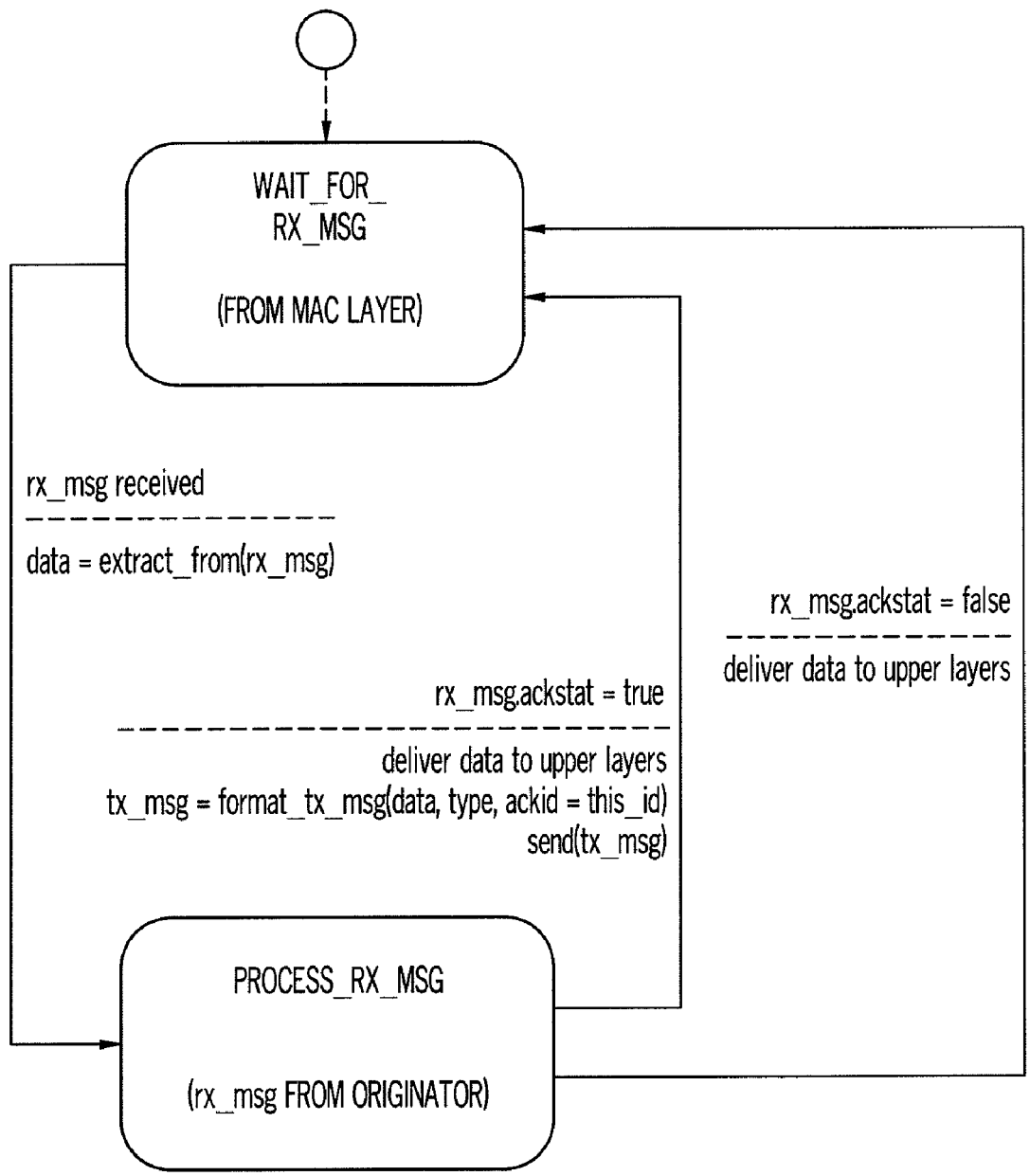
FIG. 10 shows an embodiment of a finite state machine for a REP used by a message target.

One unique aspect of the REP algorithm depicted in FIG. 9 is the ability of the application layer 219 to select whether or not a specific message requests acknowledgement. Because control scenarios often involve non-critical parameters, e.g., indicators, some messages are not bound by hard real-time constraints. To that end, the REP algorithm allows for different message types and only burdens the extension module 130 with acknowledgement "WAIT" processing for critical transactions. In the present embodiment, the "ackstat" parameter is implied within the message code. The sender selects the appropriate message code if an acknowledgement is required. It is then the responsibility of the sending node to queue the message for possible retransmission and enter the "WAIT-FOR-ACK" state. If an acknowledgement is not required, the sending node simply selects an appropriately coded "no-ACK" message type.

A possible improvement to the above REP algorithm is the use of remote transmission requests (RTR) frames by the extension module 130. In this case, if a message is lost on the RF link 126, the extension module 130 sends an RTR frame with the identifier of the lost message. When a properly configured sending node detects the RTR frame, it automatically retransmits the lost message. This variation saves some message code space, because distinct messages indicating "lost message" are not required. It also saves processing time because the re-transmission is handled without having to decode the embedded message information.

Figure 11:
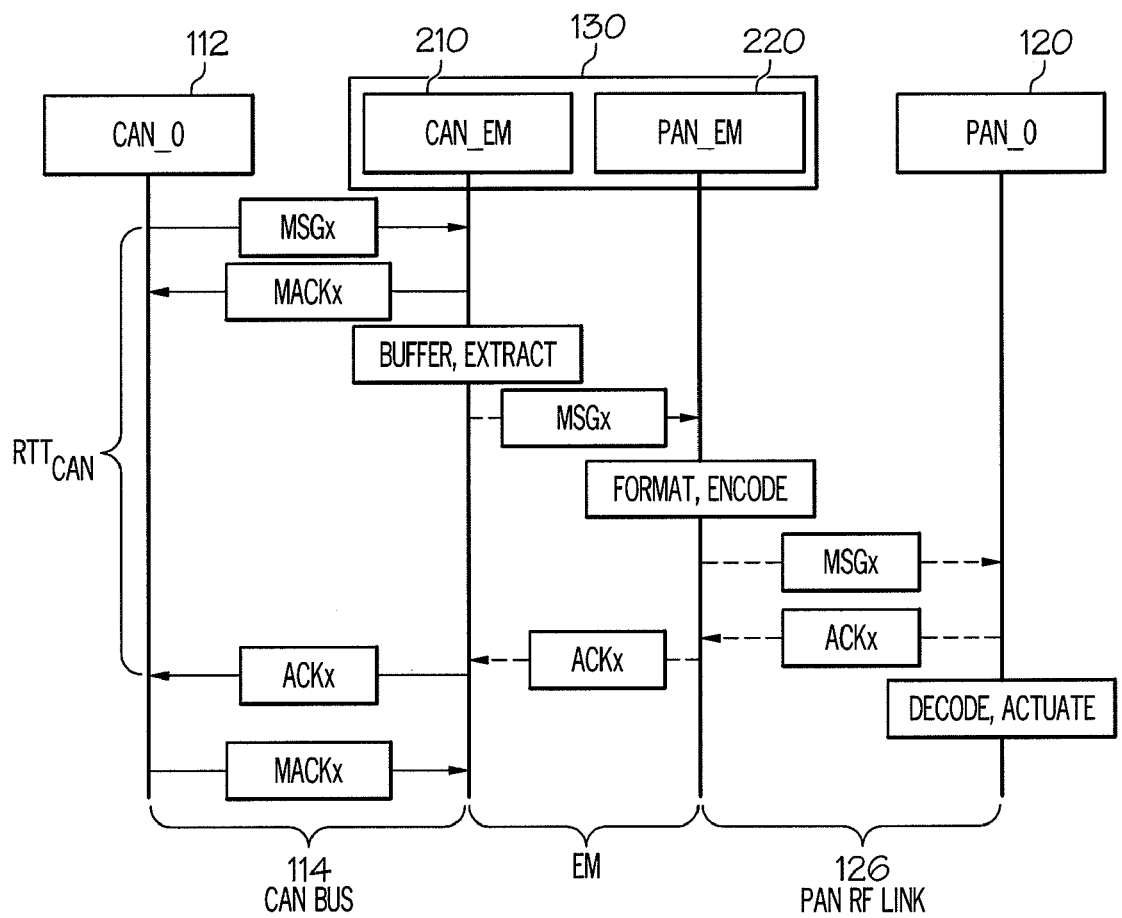
FIG. 11 shows an embodiment of a message passing sequence resulting from transferring a message from a node of the CAN network to a node of the PAN network.

Operation of the REP protocol layer 218 for a target node is shown in FIG. 11. As shown, the target node may remain in the WAIT-FOR-RX-MSG state until a message is received via the MAC layer 212. Upon receipt of a message, the target node may extract the data from the message and transition to the PROCESS-RX-MSG state. In the PROCESS-RX-MSG state, the target node may determine whether or not the received message needs to be acknowledged. If the message needs to be acknowledged (ackstat=true), then the extracted data is provided to higher layers of the CAN protocol stack 211, a new transmit message is generated that does not request an acknowledgement, and the new message is sent to the originator. If the message does not need to be acknowledged (ackstat=false), then the extracted data is provided to the higher layers of the CAN protocol stack. In either case, the target node transitions back to the WAIT-FOR-RX-MSG state to wait for the next message. Notable here is that PAN acknowledgements are sent on the RF link 126 prior to decoding the message data. A successful (error-free) reception with correct CRC check is all that is specified for the target to send the acknowledgement. Because of this behavior, some net time savings are realized due to the overlap between the ACK RF propagation and the message decode processing.

A simplified sequence diagram is shown in FIG. 11 to illustrate the operation of the inbound and outbound tunneling protocol layers 232, 234 of the extension module 130. FIG. 11 shows communication of the outbound case from the CAN network 110 to the PAN network 120. During outbound communications, the OTP layer 234 formats, encodes and transmits the message, while the ITP layer 232 handles the returned acknowledgement. The following description assumes a master CAN controller 212 is located on the CAN bus 114, and that a PAN RF link 126 connects to some remote actuator that is instructed to perform some operation. For example, the master CAN controller 212 may tell a remote RFD device 124 to turn off a valve or decrease the speed of a motor. In the CAN network 110, acknowledgments are generated from the MAC hardware automatically. These MAC hardware generated acknowledgements are referred to in FIG. 11 as "MACKs." In order to address the MAC generated acknowledgements, the extension module 130 in one embodiment includes a REP layer 218. Since the PAN network 120 is designed with a typical network acknowledgement (ACK) structure, the extension module 130 performs no additional acknowledgement (ACK) processing in regard to the PAN network 211. With that in mind, the following focuses on CAN outbound messages and their associated inbound acknowledgements.

As shown, a CAN controller 112 may initiate a transmission of a message MSGX. The message MSGX may contain data and a unique message identifier that includes a message type indicator and implicit acknowledgement request status. After an error-free reception by the CAN protocol stack 211 of the extension module 130, the message MSGX is buffered and the information is extracted by the OTP layer 234 of the extension module 130. The message MSGx including the message id 322 and data 340 are passed over the serial socket 230 to the PAN protocol stack 221 of the extension module 130.

The PAN protocol stack 221 receives the message MSGx, formats the message MSGX for PAN transmission (with optional encryption), and sends the message MSGx to a remote FFD device 122. The remote FFD device 122 acknowledges reception of the message MSGX with an acknowledgement ACKx over an RF link 126. The acknowledgement ACKx satisfies the PAN protocol stack 221 of the extension module 130 that the message was successfully received by the FFD device 122. Further, in response to the message MSGX, the FFD device 122 may perform any actuation requested by the message MSGX. For example, the FFD device 122 may toggle the state of an LED and timing test pin on a development board.

The acknowledgement ACKX received from the FFD device 122 results in the extension module 130 retransmitting the acknowledgement ACKX to the CAN bus 114. Upon reception of acknowledgementACKx, the CAN controller 112 determines that the message MSGx was received by the FFD device 122 and awaits more messages. A MAC hardware acknowledgement MACKx generated by CAN controller 112 in response to receipt of the acknowledgement ACKx satisfies the CAN protocol layer 211 of the extension module 130 that the acknowledgement ACKx transaction is complete. At this point, the CAN controller 112 and extension module 130 have verified that the original CAN MSGX was received by the FFD device 122, and further processing may commence.

While certain features of the invention have been described with reference to various embodiments, the description is not intended to be construed in a limiting sense. Various modifications of the described embodiments, as well as other embodiments of the invention, which are apparent to persons skilled in the art to which the invention pertains are deemed to lie within the spirit and scope of the invention.

What is claimed is:

1. A method of transferring a message from an originating node of a wired network to a target node of a wireless network, comprising:
   receiving the message from the originating node of the wired network with an extension module coupled between the wired network and the wireless network,
   acknowledging the message on the wired network by forcing an acknowledgement bit of the message to a dominant state, in response to the extension module determining the message has been successfully received by the extension module, to indicate successful receipt of the message by the extension module,
   transmitting the message from the extension module to the target node of the wireless network,
   waiting for a first acknowledgement message from the target node of the wireless network that indicates successful receipt of the message by the target node,
   transmitting a second acknowledgement message from the extension module to the wired network in response to receipt of the first acknowledgement message, and
   receiving with the extension module an acknowledgement of the second acknowledgement message that indicates the originating node successfully received the second acknowledgement message.

2. The method of claim 1, wherein
   the message comprises a controller area network (CAN) data frame, and
   acknowledging the message on the wired network comprises forcing an acknowledgement bit of the CAN data frame to a dominant state via a CAN protocol stack of the extension module as the message is received by the extension module.

3. The method of claim 1, further comprising
   creating a controller area network (CAN) data frame for the message received by the extension module that has an arbitration field in which a first network identifier for the originating node, a second network identifier for the target node, and a message type for the message have been placed, and
   encapsulating the CAN data frame in a data unit of the wireless network, wherein
   transmitting the message from the extension module to the target node of the wireless network comprises transmitting the data unit that encapsulates the CAN data frame created for the message.

4. The method of claim 1, further comprising, in response to determining at the extension module that a timeout period has expired while waiting for the first acknowledgement from the target node,
   resending the message from the extension module to the target node.

5. The method of claim 1, further comprising, in response to determining at the extension module that a timeout period has expired while waiting for the first acknowledgement from the target node and that extension module has already resent the message a specified number of times,
   transmitting a no acknowledgement message from the extension module to the wired network to indicate that the message was not successfully received by the target node.

6. The method of claim 1, further comprising, in response to determining at the extension module that a timeout period has expired while waiting for the first acknowledgement from the target node,
   transmitting from the extension module to the wired network a remote transmission retry (RTR) frame that includes a message identifier of the message transmitted by the originating node in order to request the originating node to resend the message.

7. A non-transitory, machine readable medium comprising a plurality of instructions that, in response to being executed by an extension module operatively coupled to a wired network and a wireless network, results in the extension module:
   acknowledging a message received from an originating node of the wired network by forcing an acknowledgement bit of the message to a dominant state, in response to the extension module determining the message has been successfully received by the extension module, to indicate successful receipt of the message by the extension module,
   transmitting the message from the extension module to a target node of the wireless network, and
   transmitting an acknowledgement message from the extension module to the wired network in response to receiving an acknowledgement message from the target node.

8. The non-transitory, machine readable medium of claim 7, wherein execution of the plurality of instructions further results in the extension module
   transmitting the acknowledgement message to the wired network only if the message received from the originating node requested such an acknowledgement message.

9. The non-transitory, machine readable medium of claim 7, wherein execution of the plurality of instructions further results in the extension module
   acknowledging the message on the wired network by forcing an acknowledgement bit of a controller area network (CAN) data frame used to carry the message to a dominant state via a media access control (MAC) layer of the extension module as the message is received by the extension module.

10. The non-transitory, machine readable medium of claim 7, wherein execution of the plurality of instructions further results in the extension module creating a controller area network (CAN) data frame having an arbitration field for the message, the arbitration field comprising a first network identifier for the originating node, a second network identifier for the target node, and a message type for the message, encapsulating the CAN data frame in a wireless personal area network (PAN) data unit, transmitting the message from the extension module to the target node of the wireless network using the wireless PAN data unit that encapsulates the CAN data frame created for the message.

11. The non-transitory, machine readable medium of claim 7, wherein execution of the plurality of instructions further results in the extension module resending the message from the extension module to the target node in response to determining that a timeout period has expired since transmitting the message to the target node.

12. The non-transitory, machine readable medium of claim 7, wherein execution of the plurality of instructions further results in the extension module transmitting a no acknowledgement message from the extension module to the wired network to indicate that the message was not successfully received by the target node in response to determining that a timeout period has expired since transmitting the message to the target node and that the message has already resent a specified number of times.

13. The non-transitory, machine readable medium of claim 7, wherein execution of the plurality of instructions further results in the extension module transmitting a remote transmission retry (RTR) frame to the wired network that includes a message identifier of the message transmitted by the originating node in order to request the originating node to resend the message in response to determining that a timeout period has expired since transmitting the message to the target node.

14. An extension module for extending a wired controller area network (CAN) to a wireless personal area network (PAN), comprising:

a CAN interface to interact with the wired controller area network (CAN), a PAN interface to interact with the wireless personal area network (PAN), and a serial socket to provide a serial link between the CAN interface and the PAN interface, the CAN interface to receive a message for a target node of the wireless personal area network (PAN) from an originating node of the wired controller area network (CAN), to automatically acknowledge the message upon receipt from the wired controller area network (CAN), to transmit the message to the PAN interface via the serial socket, and to re-acknowledge the message on the wired controller area network (CAN) in response to receiving an acknowledgement message from the PAN interface via the serial socket, and the PAN interface to wirelessly transmit the message to the target node and to send the acknowledgement message of the target node to the CAN interface via the serial socket in response to the target node acknowledging the wirelessly transmitted message.

15. The extension module of claim 14, wherein the CAN interface includes a CAN protocol stack having a media access control (MAC) layer that automatically acknowledges messages successfully received from the wired controller area network (CAN).

16. The extension modules of claims 15, wherein the CAN protocol stack further includes a reliability enhancement protocol (REP) layer to transmit the message to the PAN interface via the serial socket, and to re-acknowledge the message on the wired controller area network (CAN) in response to receiving an acknowledgement message from the PAN interface via the serial socket.

17. The extension module of claim 16, wherein the serial socket comprises an outbound layer to encapsulate the message of received from the wired controller area network (CAN) in a PAN frame for transmission by the PAN interface, and an inbound layer to extract a CAN frame from a PAN frame received by the PAN interface.

18. The extension module of claim 17, wherein the REP layer determines that a timeout period has expired since transmitting the message to the target node of the personal area network (PAN) and resends the message to the target node via the serial socket and the PAN interface.

* * * * *